United States Patent [19]

Payne

[11] Patent Number: 4,993,729
[45] Date of Patent: Feb. 19, 1991

[54] VEHICLE SUSPENSION
[75] Inventor: John S. Payne, Liberty, N.C.
[73] Assignee: Volvo GM Heavy Truck Corporation, Greensboro, N.C.
[21] Appl. No.: 407,420
[22] Filed: Sep. 14, 1989
[51] Int. Cl.5 .............................................. B60G 5/00
[52] U.S. Cl. ................................ 280/81.1; 280/149.1; 280/405.1; 280/704; 180/24.02
[58] Field of Search ....................... 280/81.1, 711, 702, 280/676, 683, 687, 686, 6.11, 405.1, 104, 149.1, 149.2, 704; 180/24.02

[56] References Cited

U.S. PATENT DOCUMENTS

| | | | |
|---|---|---|---|
| 2,393,324 | 1/1946 | Joy | 180/17 |
| 2,998,261 | 8/1961 | Bartlett | 280/81 |
| 3,027,176 | 3/1962 | Frick | 280/124 |
| 3,053,335 | 9/1962 | Gnade et al. | 180/22 |
| 3,055,678 | 9/1962 | Alfieri | 280/104.5 |
| 3,096,995 | 7/1963 | Richnow | 280/104.5 |
| 3,154,321 | 10/1964 | McLean | 280/124 |
| 3,718,346 | 2/1973 | Self et al. | 280/415 B |
| 3,791,664 | 2/1974 | Self et al. | 280/124 F |
| 3,870,336 | 3/1975 | Bilas | 280/124 F |
| 4,033,607 | 7/1977 | Cameron | 280/711 |
| 4,222,578 | 9/1980 | Meisel | 280/6.11 |
| 4,256,326 | 3/1981 | Cantrell et al. | 280/683 |
| 4,284,156 | 8/1981 | Cartensen et al. | 180/24.02 |
| 4,335,901 | 6/1982 | Gladish | 280/711 |
| 4,445,707 | 5/1984 | Raidel | 280/687 |
| 4,504,079 | 3/1985 | Strong | 280/683 |
| 4,553,773 | 11/1985 | Pierce | 280/676 |
| 4,558,886 | 12/1985 | Straub | 280/711 |
| 4,614,247 | 9/1986 | Sullivan | 180/24.02 |
| 4,619,578 | 10/1986 | Routledge | 414/498 |
| 4,637,627 | 1/1987 | Stone | 280/686 |
| 4,740,005 | 4/1988 | Babin | 280/405 A |
| 4,756,548 | 7/1988 | Kaltenthaler et al. | 280/702 |

Primary Examiner—Richard A. Bertsch
Attorney, Agent, or Firm—Watts, Hoffmann, Fisher & Heinke Co.

[57] ABSTRACT

An over the highway truck or tractor suspension with traction enhancement. Air springs are provided for the rear axles of a 2×6 vehicle. Normally the load is evenly divided between driven and tag axles. When enhanced traction is desired, the tag axle springs are communicated with an auxiliary tank to reduce pressure in them while air under pressure is supplied to the driven axle springs to increase the pressure in them and thereby increase the portion of the load on the driven axle to provide enhanced traction.

31 Claims, 3 Drawing Sheets

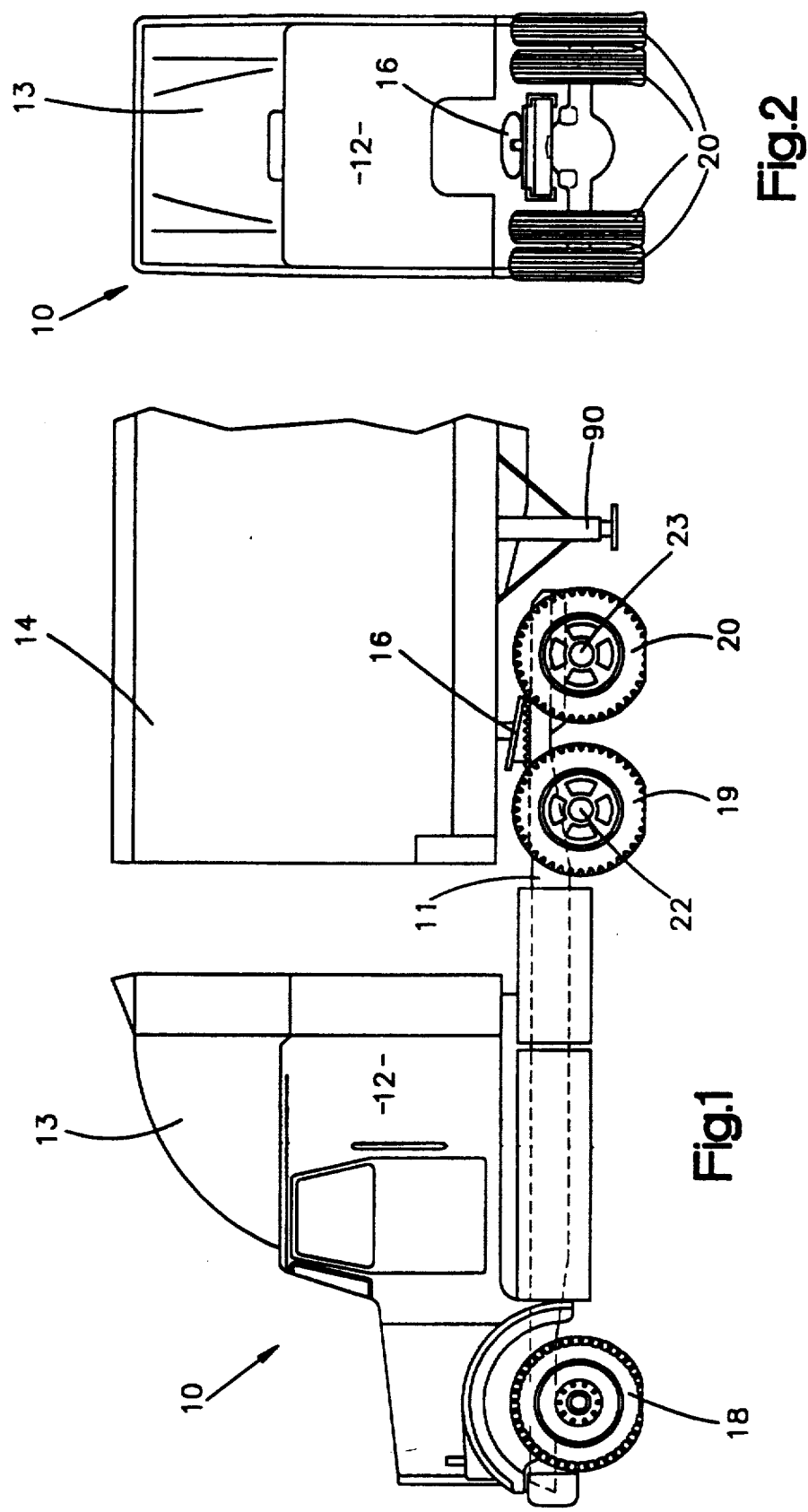

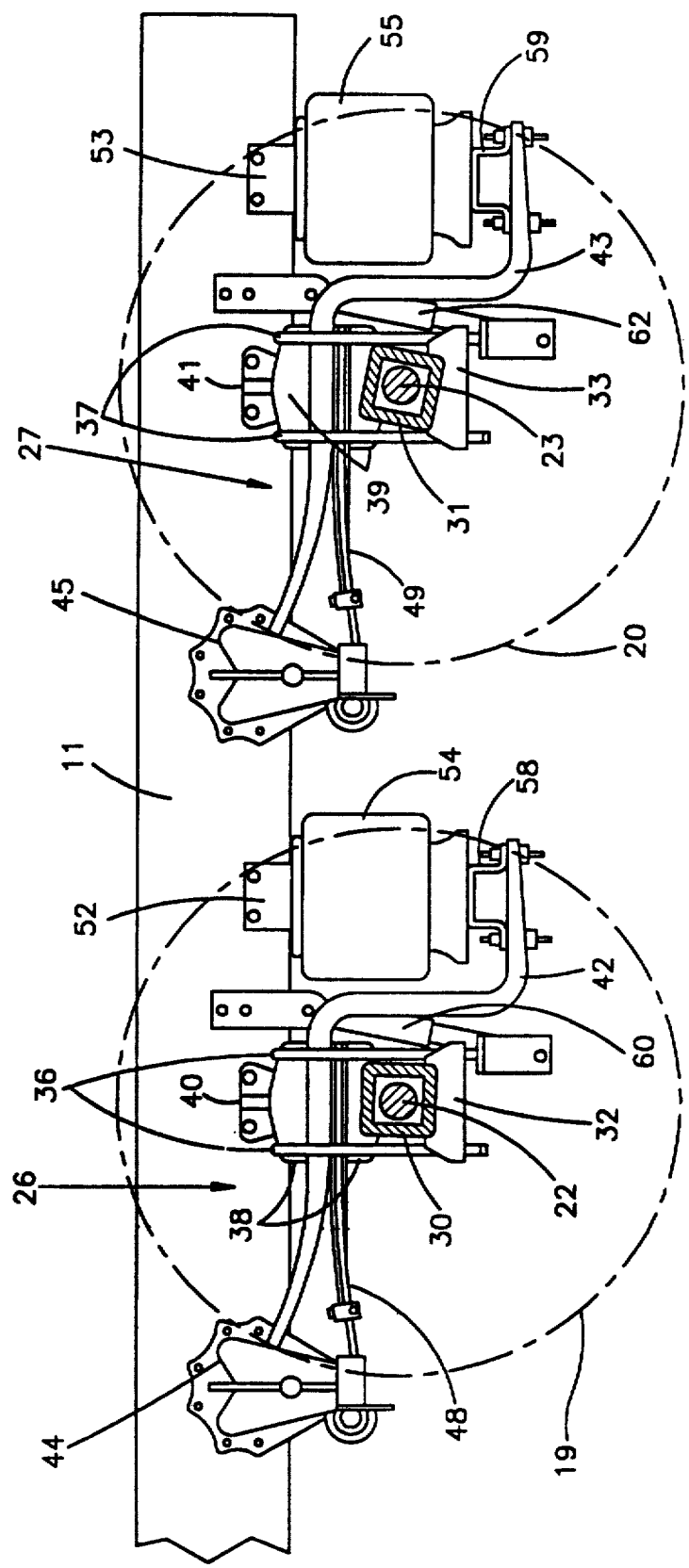

VEHICLE SUSPENSION

TECHICAL FIELD OF THE INVENTION

This invention relates to vehicle suspensions and more particularly to a vehicle suspension which is especially suited for use in over the highway tandem axle trucks and tractors.

BACKGROUND OF THE INVENTION

In over the highway trucks and tractors it is now conventional to provide dual or tandem rear axles. In a majority of cases, at least in over the highway trucks and tractors used in North America, the rear axles are interconnected by an interaxle differential and both axles provide traction. The major advantage of driven tandem axles is that when ascending steep grades and when surface conditions are slippery the typical vehicle equipped with dual wheels has eight driven wheels to provide traction.

Other over the highway trucks with tandem rear axles have been equipped with one driven axle and a non-driven or tag axle. The advantage of the single driven axles versus dual driven axles is the elimination of the inter axle differential, a drop gear set and a rear axle ring and pinion. This results in increased fuel economy due to reduced friction and reduced weight.

Vehicles with adjustable loading on the driven axle, to enhance driven axle traction when desired, have been proposed. According to this proposal the driven axle is supported by leaf springs while the tag axle is supported by air springs. An air pressure control leveling valve is provided. The leveling valve is actuated by an operating rod which carries a roller that contacts the leaf spring. During normal operation this leveling valve functions to supply air under pressure at appropriate pressures to the tag axle air springs to maintain the vehicle at a desired level. When enhanced traction is desired, a manually operated change-over valve closes the leveling valve to air spring connection and vents the air spring to atmosphere to reduce the pressure in the air spring. A problem with this proposal is that the ability to level the vehicle to maintain a desired height is lost. Another problem is there is no provision to be certain that the driven axle is not overloaded. A further problem is the extent of tag axle air spring venting is controlled by a valve and as such the precision of air pressure control is a function of the condition of the control valve.

SUMMARY OF INVENTION

According to this invention an over the highway truck or tractor is provided with front steerable wheels and tandem rear axles. One of the rear axles is a driven axle while the other is a tag axle.

The rear axles are each supported by a pair of air springs. Under normal operating conditions, an air supply is connected to the axle air springs through a height valve. The height valve supplies air under pressure in a predetermined ratio to the driven axle and the tag axle springs respectively. In the preferred embodiment the height valve senses the height of the vehicle and under normal operating conditions provides air to the air springs in a 50/50 ratio to maintain the vehicle within a desired height range with the driven and non-driven axles sharing the loading equally.

A traction enhancement control valve, sometimes referred to as an axle differential control, is provided. When enhanced traction is desired, the operator actuates the enhancement control valve to move it from a normal operating position to an enhanced traction position. The enhancement control valve signals a traction control pilot valve to shut off the air supply to the tag axle springs and concurrently to communicate the tag axle springs with an auxiliary air tank.

Under enhanced traction conditions the height valve is actuated to increase the pressure in the driven axle springs to return the vehicle to, or maintain the vehicle in, its desired height range while concurrently the tag axle spring pressure is reduced. Preferably this increase of pressure in the driven axle and reduction of pressure in the tag axle results in a spring pressure ratio with approximately sixty percent of the load on the driven axle and forty percent on the tag axle.

With the preferred system, when the traction enhancement control is returned to its normal position, the traction control pilot valve returns to its original position communicating the tag axle springs to the height valve. Concurrently a tank dump pilot valve is actuated to vent the auxiliary tank to atmosphere.

In the preferred and disclosed arrangement, a dump control valve is provided. The dump control valve is connected to a dump control pilot valve. On actuation of the dump control valve, the dump control pilot valve isolates the height valve from both air springs and vents the air springs to atmosphere to selectively lower the vehicle for such purposes as facilitating the coupling or uncoupling of a cargo trailer.

One of the outstanding features of this invention is the provision of a traction enhancement system in which loading on the driven axle is selectively increased but, nonetheless, loading stays within lawful limits. The current limitations under Federal Law, and the laws of most states, is a total of 34,000 pounds maximum on tandem axles with the maximum per axle being 20,000 pounds. Assuming a maximum lawful load of 34,000 pounds, with the preferred and disclosed arrangement in normal operation the driven and non-driven axles each support 17,000 pounds. When the traction enhancement system is actuated, the loading on the driven axle is increased to no more than 20,000 pounds and that of the non-driven axle reduced to no less than 14,000 pounds. Thus, a ratio for traction enhancement purposes of approximately 60/40 is provided as contrasted with the preferred normal ratio of 50/50 load distribution.

The change from a 50/50 to a 60/40 load distribution is accomplished by communicating the tag axle air springs with an auxiliary tank. The tank is sized to produce a total air pressure containment volume made up of the air springs, the auxiliary tank and the communicating conduit which will reduce the pressure relative to the pressure in the driven axle springs to a value which will support slightly more than 40% of the weight. Since reduction of pressure in the tag axle springs will result in some lowering of the vehicle, the height valve will operate to supply air under pressure to the driven axle springs to reelevate the vehicle into the desired height range.

Thus, the auxiliary tank provides a plenum which produces a pressure reduction in the tag axle springs to a level such that with the attendant pressure increase in the driven axles springs the load is redistributed in a ratio of approximately 60/40. Since the pressure reduction is accomplished by increasing the volume of space available for the air in the spring, rather than venting to atmosphere to an extent permitted by a pressure relief valve, pressure reduction is consistent and not dependent on the condition of a valve.

One tandem axle system made in accordance with the preferred and disclosed embodiment of the invention weighs between 95 and 158 pounds less than commercially available tandem driven axles systems with four metal springs. When compared with competitive currently available air suspension, dual driven axles systems, the weight saving is even more impressive in that it is in the range of 256-318 pounds less than such competitive suspensions.

Clearly the value of a vehicle equipped with suspension of this invention, when viewed only from the standpoint of increased revenue capabilities, is significant. Assuming a vehicle life expectancy of 500,000 miles and a weight saving of but 100 pounds, the vehicle can lawfully produce 25,000 ton miles more over its life than a vehicle equipped with such heavier suspension.

In addition to the advantages of weight reduction, tests have shown that a vehicle equipped with the suspension of this invention produces an increase in fuel economy of more than 2% over an otherwise identical vehicle equipped with a conventional tandem driven axle bogie. In sum, a vehicle equipped with the suspension of this invention has the fuel economy advantages of a so-called 6×2 vehicle, that is a vehicle with one driven axle, while with the traction enhancement of this invention when road conditions require it has traction capabilities approaching that of tandem driven axle vehicles.

Accordingly, an object of this invention is to provide a vehicle with a novel and improved suspension and a method of operating such a vehicle.

BRIEF DESCRIPTION OF THE DRAWINGS

FIG. 1 is a side elevational view of a highway tractor made in accordance with this invention and a fragmentary view of a coupled trailer;

FIG. 2 is a rear elevational view the vehicle of FIG. 1;

FIG. 3 is a side elevational view of the suspension of this vehicle; and

BEST MODE FOR CARRYING OUT THE INVENTION

Figure 4:
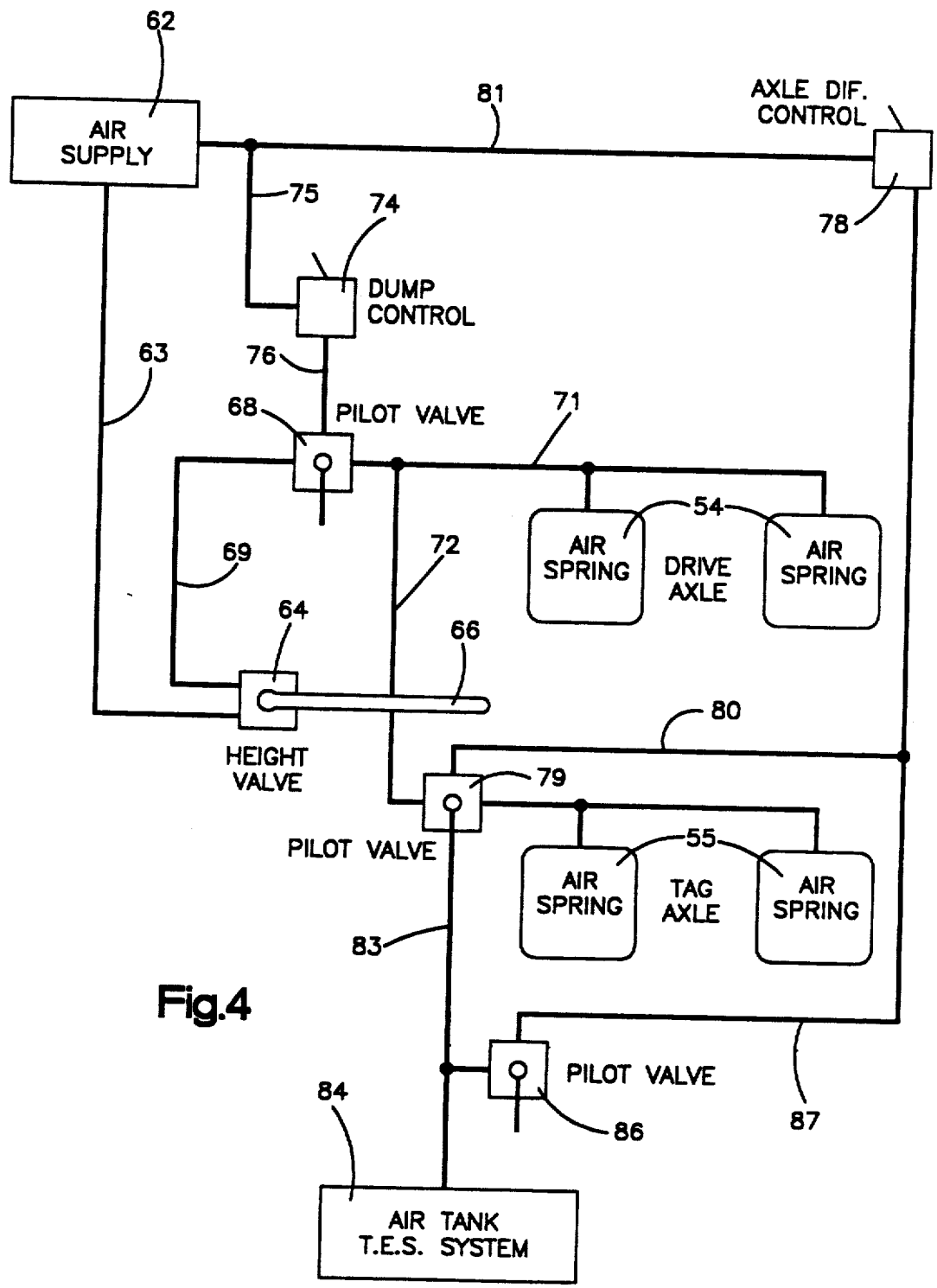
FIG. 4 is a diagrammatic view of the air suspension system of this invention.

An over the highway tractor is shown generally at 10 in FIGS. 1 and 2. The tractor includes a frame 11 supporting a cab 12. A wind deflector 13 is mounted on the cab. A trailer 14 is depicted as coupled to the tractor 10 by a conventional fifth wheel assembly 16.

The tractor 10 is supported by front steerable wheels 18 and tandem rear wheels 19, 20. The forward rear wheels 19 are carried by a driven axle 22 while the rearward wheels 20 are carried by a non-driven or tag axle 23. The driven and tag axles 22, 23 are connected to and support the frame 11.

Referring now to FIG. 3, drive and tag axle support assemblies 26, 27 are provided. The suspensions 26, 27 support the axles 22, 23 through axle housings 30, 31 respectively. The axle housings 30, 31 are respectively supported by lower axle seats 32, 33. Driven and tag axle pairs of U-bolts 36, 37 respectively clamp the axles between the axle seats 32, 33 and pairs of spring seats 38, 39. Bump stops 40, 41 are visible behind upper ones of the spring seats 38, 39. The bump stops function to limit the maximum rise of the axles.

The suspensions 26, 27 respectively include generally Z-shaped, single leaf spring, trailing arms 42, 43. Trailing arm connection brackets 44, 45 are respectively connected to the frame 11. The connection brackets 44, 45 are connected to the trailing arms 42, 43 at their respective forward ends. Reaction springs 48, 49 are respectively interposed between the spring seats 38, 39 and the trailing arms 42, 43. Thus, the arms 42, 43 and springs 48, 49 are respectively clamped to the axle housings 30, 31 by the U-bolts 36, 37.

The driven and tag axle suspensions 26, 27 respectively include air spring support flanges 52, 53 which are secured on the frame 11. The support flanges 52, 53 respectively support driven and tag axle air springs 54, 55. Air spring mounting brackets 58, 59 are respectively interposed between and connected to the trailing arms 42, 43 and the air springs 54, 55.

It will be appreciated that FIGS. 1 and 3 are elevational views of the port or left side of the vehicle. The axles 22, 23 are each supported on the right or starboard side of the vehicle by suspensions which are the mirror images of the suspensions 26, 27. The suspension system as thus far described is conventional.

Referring now to FIG. 4, an air supply is shown schematically at 62. The air supply 62 has an output supply conduit 63 coupled to a height valve 64. The height valve 64 is a conventional height valve having an arm 66 which senses height of vehicle frame and adjusts the pressure supplied to the air springs 54, 55 accordingly. A suitable height valve is that sold commercially by Hadley Manufacturing Division of Nelson Metal Products Company, Grandville, Mich. under the designation H00450-34. The height valve 64 is connected to a dump control pilot valve 68 by a pressure supply conduit 69. During normal operation the pressure supply conduit 69 communicates through the dump control pilot valve 68 with driven and tag axle spring supply conduits 71, 72. A suitable dump control pilot valve is that sold commercially by Humphrey Products, Kalamazoo, Mich. under the designation 250A-3-11-21.

A dump control valve 74 is provided. The dump control valve 74 is connected to the air supply by an air supply conduit 75. A suitable dump control valve is an air-electric switch sold commercially by G. T. Development Corporation, Seattle, Wash. under the designation 3200-1C. The dump control valve is connected to the dump control pilot valve 68 through a dump actuation conduit 76. On actuation of the dump control valve 74, the dump control pilot valve 68 is moved to sever the communication between the pressure supply conduit 69 and the spring supply conduits 71, 72 and in turn to vent the spring supply conduits.

A traction enhancement control 78 is provided. The air-electric switch used as the dump control valve 74 is also a suitable traction enhancement control. The traction enhancement control 78 is connected to a traction control pilot valve 79 via traction control conduit 80. Air under pressure is supplied to the traction control 78 from the supply 62 via a conduit 81.

On movement of the traction enhancement control 78 from its normal to a traction enhancement position the traction control pilot valve 79 is energized to terminate communication between the height valve and the tag axle air springs 55. Concurrently the traction control pilot valve communicates the air springs via a traction enhancement conduit 83 to an auxiliary air tank 84. A suitable traction control pilot valve is the same as the valve used as the dump control valve 68.

On return of the traction enhancement control 78 to its normal position, a tank dump pilot valve 86 is actuated by release of air under pressure delivered to it from the control 78 through tank vent conduit 87 to vent the tank 84 to atmosphere. Concurrently the traction control pilot valve 79 is returned to its normal position reconnecting the air spring 55 to the height valve 64. A suitable tank dump pilot valve is another Humphrey 250A-3-11-21 valve.

OPERATION

In operation, assuming the tractor 10 is not coupled to the trailer 14, and the trailer 14 is supported by its legs 90, the operator will back the tractor into alignment with the trailer. The operator then will actuate the dump valve 74 to shift the dump valve pilot valve 68 severing communication between the pressure supply conduit 69 and the air springs. This concurrently vents the air springs to dump them and lower the vehicle frame 11. The operator then backs the tractor under the trailer and couples the fifth wheel 16. The dump control 74 is returned to its normal position so that the dump control pilot valve 68 will reestablish communication between the height valve 64 and the air springs to inflate them in their normal 50/50 relationship.

When the operator encounters conditions calling for enhanced traction, he will shift the traction control 78 from its normal position to its traction enhancement condition. This signals the traction control pilot valve 79 to sever communication between the tag axle air springs 55 and the height valve 64 and concurrently to communicate the tag axle air springs 55 with the auxiliary tank 84 via the traction enhancement conduit 83. The height valve will sense the resultant lowering of the vehicle and supply further air pressure to the driven axle air springs 54 to restore the vehicle to its normal height range. At this juncture approximately 60% of the load is on the driven axle and 40% on the tag axle.

After the need for traction enhancement has passed the operator will return the traction control 78 to its normal position. This causes the traction control pilot valve 79 to reestablish communication between the tag axle air spring 55 and the height valve 64 via the tag axle spring supply conduit 72. Concurrently, the tank dump pilot valve 86 is actuated to vent the auxiliary air tank 84 to atmosphere. The vehicle has now been reestablished in its normal operating range with the load distributed equally between the driven and tag axles.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

I claim:

1. In an over the highway truck or tractor vehicle having tandem rear axles one of which is a driven axle and the other is a tag axle the improvement comprising:
   a. at least one driven axle fluid spring and at least one tag axle fluid spring, the springs respectively being interposed between the driven and tag axles and a vehicle frame;
   b. a supply of fluid under pressure;
   c. conduits connecting the supply to the springs;
   d. pressure control means connected to at least one of the conduits for normally maintaining a predetermined pressure ratio between the pressure in the at least one driven axle spring and the at least one tag axle spring; and,
   e. an operator actuatable traction enhancement control for selectively altering said predetermined ratio to provide a relative increase of the pressure in the at least one driven axle spring relative to the pressure in the at least one tag axle spring.

2. The vehicle of claim 1 wherein a height valve is provided to control the pressure in the springs to maintain the vehicle height at a desired level both when the predetermined ratio is normally maintained and when it is altered by actuation of the traction enhancement control.

3. The vehicle of claim 1 wherein the fluid supply is an air supply.

4. The vehicle of claim 1 wherein there are a pair of driven axle springs and a pair of tag axle springs.

5. In an over the highway haul vehicle having driven and non driven wheels, an improved suspension comprising:
   a. a first pair of air springs interposed between the driven wheels and a vehicle frame to provide driven wheel support for the vehicle;
   b. a second pair of air springs interposed between the non driven wheels and the frame to provide non driven wheel support for the vehicle;
   c. a supply of air under pressure;
   d. an air pressure communicating means for supplying air under pressure from the supply to the springs and substantially maintain predetermined relative pressures in the first springs relative to the second during normal operation; and,
   e. selectively actuatable means for reducing pressure in the second springs relative to the first including means selectively to increase the pressure in the first springs.

6. The vehicle of claim 5 wherein the driven wheels are mounted on a driven axle and the non driven are mounted on a tag axle.

7. The vehicle of claim 5 wherein the selectively actuated means includes an operator actuated traction control valve.

8. The vehicle of claim 5 wherein the means selectively to increase the pressure in the first springs includes a height valve.

9. The vehicle of claim 5 wherein a dump control valve is connected to the springs for releasing air under pressure from the springs selectively to lower the vehicle.

10. A haul vehicle comprising:
    a. a frame;
    b driven and tag axles connected to the frame;
    c. pairs of driven and tag axle air springs respectively interposed between the driven and tag axles and the frame;
    d. a supply of compressed air; and,
    e. an air supply system connecting the supply to the springs, the system including:
       i. a height valve connected to the springs and responsive to vertical relative movement of the frame and axles for controlling pressure in at least the driven axle springs thereby to maintain the height of the vehicle frame within a predetermined range; and, ii. an operator actuatable axle differential control valve operatively connected to the tag axle spring, the differential control valve having a traction enhancement position wherein a signal is transmitted to alter the supply of air under pressure from the height valve to the tag axle springs and to permit the flow of air from the tag axle springs whereby to reduce pressure in the tag axle springs.

11. The vehicle of claim 10 wherein there is a dump control valve in the system connected to the springs whereby air in the springs may be selectively dumped to the ambient atmosphere.

12. The vehicle of claim 10 wherein there is an auxiliary tank to receive air from the tag axle springs when the differential control valve is in the traction enhancement position and air is released from the tag axle springs.

13. The vehicle of claim 12 wherein the differential control valve has a normal position and a tank dump valve is operatively connected to the differential control valve and connected to the auxiliary tank whereby to vent the auxiliary tank when the differential control valve is in its normal position.

14. A haul vehicle comprising:
 a. a frame;
 b. a driven rear axle connected to the frame;
 c. a tag rear axle connected to the frame;
 d. a pair of driven axle air springs interposed between the driven axle and the frame;
 e. a pair of tag axle air springs interposed between the tag axle and the frame;
 f. a supply of compressed air; and,
 g. an air supply system connecting the supply to the springs, the system including:
  i. an auxiliary air tank;
  ii. a traction control valve coupled to the tag axle springs, the traction control valve also being connected to the auxiliary tank; and,
  iii. an operator actuatable axle differential control valve operatively connected to the traction control valve, the differential control valve having a traction enhancement position wherein a signal is transmitted to the traction control valve to alter the supply of air under pressure to the tag axle springs and to couple the tag axle springs to the auxiliary tank whereby to reduce pressure in the tag axle springs.

15. The vehicle of claim 14 wherein the system includes dump control valve connected to the springs whereby air supply to the springs may be selectively interrupted and the air in the springs may be dumped.

16. The vehicle of claim 14 wherein the differential control valve has a normal position and wherein a tank dump valve is operatively connected to the differential control valve and connected to the auxiliary tank whereby to vent the auxiliary tank to atmosphere when the differential control valve is in its normal position.

17. A haul vehicle comprising:
 a. a frame;
 b. a driven rear axle connected to the frame;
 c. a tag rear axle connected to the frame; interposed between the driven axle and the frame;
 e. a pair of tag axle air springs interposed between the tag axle and the frame;
 f. a supply of compressed air; and,
 g. an air supply system connecting the supply to the springs, the system comprising:
  i. a height valve connected to the supply and to the springs and responsive to vertical relative movement of the frame and axle for controlling pressure in at least the driven axle springs thereby to maintain the height of the vehicle frame within a predetermined range;
  ii. an auxiliary air tank;
  iii. a traction control valve coupled to the height valve output between the height valve and the tag axle springs, the traction control valve also being connected to the auxiliary tank; and,
  iv. an operator actuatable axle differential control valve operatively connected to the traction control valve, the differential control valve having a traction enhancement position wherein a signal is transmitted to the traction control valve to cause the latter to stop the supply of air under pressure from the height valve to the tag axle springs and to couple the tag axle springs to the auxiliary tank whereby to reduce pressure in the tag axle springs.

18. The vehicle of claim 17 wherein there is a dump control valve connected to the height valve output and the springs whereby air supply to the springs may be selectively interrupted and the air in the springs may be dumped to the ambient atmosphere.

19. The vehicle of claim 17 wherein the differential control valve has a normal position and wherein a tank dump valve is operatively connected to the differential control valve and connected to the auxiliary tank whereby to vent the auxiliary tank when the differential control valve is in its normal position.

20. A haul vehicle comprising:
 a. a frame;
 b. a pair of front steerable wheels connected to the frame;
 c. a driven rear axle connected to the frame;
 d. a tag rear axle connected to the frame;
 e. a pair of driven axle air springs interposed between the driven axle and the frame;
 f. a pair of tag axle air springs interposed between the tag axle and the frame;
 g. a supply of compressed air; and,
 h. an air supply system connecting the supply to the springs, the system comprising:
  i. a height valve responsive to vertical relative movement of the frame and axles for controlling pressure in at least the driven axle springs thereby to maintain the height of the vehicle frame within a predetermined range;
  ii. a height valve supply conduit connected to the supply and the height valve for delivering air under pressure from the supply to the height valve;
  iii. a height valve output conduit connected to the height valve and the springs for delivering air under pressure from the height valve to the springs;
  iv. an auxiliary air tank;
  v. a traction control pilot valve coupled to a branch of the height valve output conduit between the height valve and the tag axle springs, the traction control pilot valve also being connected to the auxiliary tank by an auxiliary tank conduit; and
  vi. an operator actuatable axle differential control valve operatively connected to the traction control pilot valve, the differential control valve having a traction enhancement position wherein a signal is transmitted to the traction control pilot valve to cause the latter to stop the supply of air under press from the height valve to the tag axle springs and to couple the tag axle springs to the auxiliary tank through a tank conduit whereby to reduce pressure in the tag axle springs.

21. The vehicle of claim 20 wherein there is a dump control pilot valve connected to the height valve output conduit and a dump control connected to the dump control pilot whereby air supply to the springs may be selectively interrupted and the air in the springs may be dumped to the ambient atmosphere.

22. The vehicle of claim 21 wherein he differential control valve has a normal position and wherein a tank dump pilot valve is operatively connected to the differential control valve and connected to the tank conduit whereby to vent the auxiliary tank to atmosphere when the differential control valve is in its normal position.

23. A vehicle comprising:
   a. a longitudinally extending frame having front and rear portions;
   b. steerable wheels connected to the front portion;
   c. driven and tag axles connected to the rear portion and respectively carrying driven and non-driven wheels;
   d. driven and tag axle air springs respectively interposed between the frame and the driven and tag axles;
   e. a supply connected to the springs by a conduit and valving system including valve means for maintaining a predetermined pressure ratio in the springs during normal operation; and,
   f. the system including an operator controlled traction enhancement subsystem for selectively enhancing driven wheel traction under special conditions and including ratio changing means for changing the pressure ratio to increase the portion of a load supported by the driven axle while concurrently maintaining the vehicle in a predetermined height range irrespective of the total load imposed on the vehicle wheels.

24. The vehicle of claim 23 wherein an auxiliary tank is provided and wherein the ratio changing means includes structure establishing fluid communication between the tag axle springs and the auxiliary tank when the ratio changing means is actuated under such special conditions.

25. The vehicle of claim 24 wherein the auxiliary tank is vented to atmosphere during such normal operation.

26. The vehicle of claim 24 wherein the ratio changing means including structure defining a plenum and valve means for selectively communicating the tag axle springs with the plenum for tractor enhanced operation whereby the expand the volume for containment of a quantity of air in the tag axle springs during normal operation to reduce the pressure of such known quantity in a predetermined ratio.

27. A vehicle comprising:
   a. a longitudinally extending frame having front and rear portions;
   b. steerable wheels connected to the front portion;
   c. driven and tag axles connected to the rear portion and respectively carrying driven and nondriven wheels;
   d. driven and tag axle air springs respectively interposed between the frame and the driven and tag axles;
   e. a supply connected to the springs by a conduit and valving system including valve means for maintaining a predetermined pressure ratio in the springs during normal operation;
   f. the system including an operator controlled traction enhancement subsystem for selectively enhancing driven wheel traction under special conditions and including ratio changing means for changing the pressure ratio to increase the portion of a load supported by the driven axle; and,
   g. the ratio changing means including structure defining a plenum and valve means for selectively communicating the tag axle springs with the plenum for traction enhanced operation whereby to expand the volume for containment of a quantity of air in the tag axle springs during normal operation to reduce the pressure of such known quantity in a predetermined ratio.

28. A method of operating a vehicle having driven and tag axles and driven and tag axle fluid springs respectively interposed between the driven and tag axles and a vehicle frame comprising:
   a. operating a height valve to communicate a supply of air under pressure with the springs during normal operation to maintain a predetermined normal operation pressure ratio between the driven and tag axle springs;
   b. actuating a traction enhancement control when enhanced traction is desired to communicate the tag axle springs and a plenum thereby expanding the volume containing the quantity of air in the tag axle springs to increase with an attendant and concurrent predetermined reduction in the pressure of such quantity; and
   c. returning the traction enhancement control to its preactuation condition to terminate communication with the plenum and substantially concurrently establishing communication between the tag axle springs and the supply of air under pressure.

29. The method of claim 28 including the step of actuating a height valve after the traction enhancement control has been actuated thereby communicating the driven axle springs with the supply of air under pressure to increase the pressure in the driven axle springs during traction enhanced conditions.

30. The method of claim 28 including the step of maintaining equal loading on the axles during normal operation and increasing the load on the driven axle to about 60% of the total while reducing the load on the tag axle to about 40% of the total during enhanced traction operation.

31. The method of claim 30 wherein the load on the driven axle is limited to less than 20,000 pounds.

* * * * *

UNITED STATES PATENT AND TRADEMARK OFFICE
CERTIFICATE OF CORRECTION

PATENT NO. : 4,993,729
DATED : February 19, 1991
INVENTOR(S) : John S. Payne

It is certified that error appears in the above-identified patent and that said Letters Patent is hereby corrected as shown below:

Column 7, line 62, should read -- c. a tag rear axle connected to the frame; --

Column 7, line 63, should read -- d. a pair of driven axle air springs interposed between the driven axle and the frame; --

Signed and Sealed this

Ninth Day of February, 1993

*Attest:*

STEPHEN G. KUNIN

*Attesting Officer*   Acting Commissioner of Patents and Trademarks